United States Patent [19]

Gulati

[11] 3,824,602

[45] July 16, 1974

[54] CLOSED CELL POLYURETHANE FOAM PEN GUIDE DAMPER

[75] Inventor: Ved Kumar Gulati, Webster, N.Y.

[73] Assignee: Xerox Corporation, Stamford, Conn.

[22] Filed: Mar. 30, 1973

[21] Appl. No.: 346,497

[52] U.S. Cl. .......... 346/139 C, 267/153
[51] Int. Cl. .......... G01d 15/00
[58] Field of Search .......... 346/139 C, 139 R, 74 S, 346/74 SB, 74 SC, 68; 267/137, 153

[56] References Cited

UNITED STATES PATENTS 2,714,047 7/1955 Dehmel .......... 346/49 X
3,231,256 1/1966 Olson .......... 267/153
3,735,040 5/1973 Punt et al. .......... 346/68 X

*Primary Examiner*—Joseph W. Hartary

[57] ABSTRACT

A writing stylus assembly for recording incoming facsimile signals on a writing medium such as an electroresistive paper held around a drum of a facsimile transceiver, comprises a spring means for pressing the stylus tip so that the tip rides on the surface of the writing medium with a predetermined amount of pressure, a lever which moves, upon actuation, the tip of the writing stylus away from the drum and the writing medium, and means responsive to the deactuation of the lever for retarding the relaxation time of the spring to prevent the stylus tip from hitting against the drum.

1 Claim, 5 Drawing Figures

PATENTED JUL 16 1974 3,824,602

SHEET 1 OF 2

CLOSED CELL POLYURETHANE FOAM PEN GUIDE DAMPER

BACKGROUND OF THE INVENTION

This invention relates to a writing stylus assembly and more particularly, to an improved writing stylus assembly for use in a facsimile transceiver.

In a facsimile transceiver of the type, such as the 400 Telecopier facsimile unit manufactured by Xerox Corporation, an electrically conductive writing stylus is used to record incoming facsimile signals on an electroresistive paper. The electroresistive paper includes a thin white top layer and a carbon layer beneath the white layer. As the signal current from the stylus tip flows through the white layer onto the carbon layer, the area of the white layer touched by the tip of the stylus is burned off. In order to maintain a good electrical contact between the stylus tip and the paper, a pen guide holding the stylus is spring biased so that the stylus tip presses the paper against the surface of a cylindrical drum with a certain amount of pressure.

The transceiver includes a carriage for the stylus assembly for moving the stylus to a desired location or starting position on the drum. The stylus assembly includes a lever mechanism which moves the pen guide and the stylus tip away from the drum to avoid unnecessary wear and tear to the stylus, as the operator moves the carriage and the assembly to a desired location. The pen guide holding the stylus is pivotally mounted to the assembly frame and spring biased so that it can apply a torque to the stylus tip and thereby apply a predetermined amount of pressure against the drum.

It has been found that the operators tend to be a bit rough in handling such facsimile transceivers. They tend to release the lever mechanism rather quickly in a snapping fashion after they move the carriage to the desired location or as they near the desired location. When the lever is actuated it applies a torque to move the pen guide and the stylus tip away from the drum. When the lever is released the spring relaxes and moves the pen guide and the stylus tip back to the position where the tip contacts the drum. Snappy release of the lever tends to cause the stylus tip to snap back under the decompressing force of the spring and hit against the drum. In the use of the transceiver, this hitting action is repeated and it has been found that a cumulative effect of the hitting action is to bend or damage the tip which is typically made of fine conductive wires of a few mils in diameter. The bent or damaged tip results in increasing the contact area between the stylus tip and electroresistive paper and thus causes deteriation of the resolution or quality of the reproduced copy and shorten the useful life of the stylus assembly.

SUMMARY OF THE INVENTION

It is an object of this invention to provide an improved writing stylus assembly.

It is another object of the present invention to extend the useful life of the stylus assembly.

These and other objects of the present invention are achieved by providing means in the stylus assembly which retards the spring action of the existing spring so that the writing stylus tip is prevented from snapping back and hitting against the drum when the movable lever is released to return the tip to its normal writing position.

It is a feature of the present invention to use a closed cell polyurethane foam for the retarding member.

It is another feature of the invention to surround the spring member with the polyurethane foam.

DETAILED DESCRIPTION OF THE INVENTION

Figure 1:
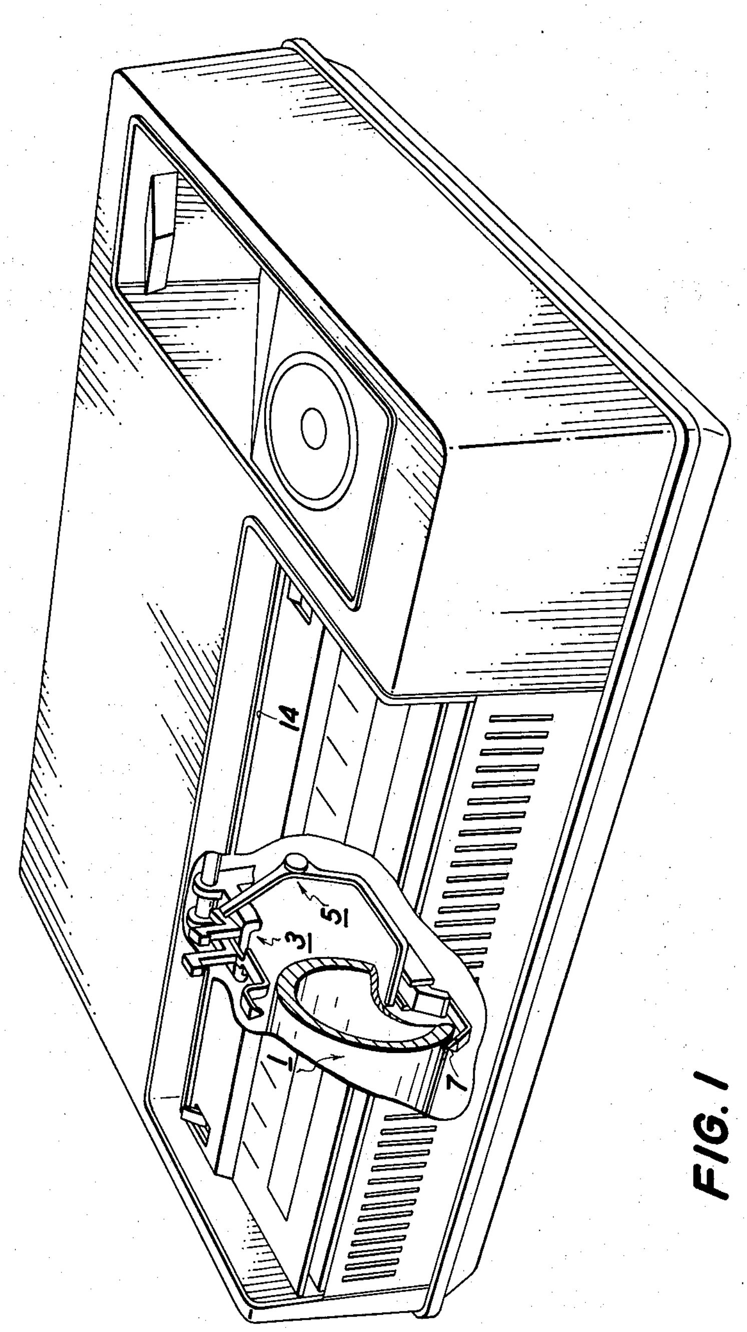
FIG. 1 shows the exterior housing for a facsimile transceiver with a portion of the housing broken away to illustrate the improvement according to the invention.
Figure 2:
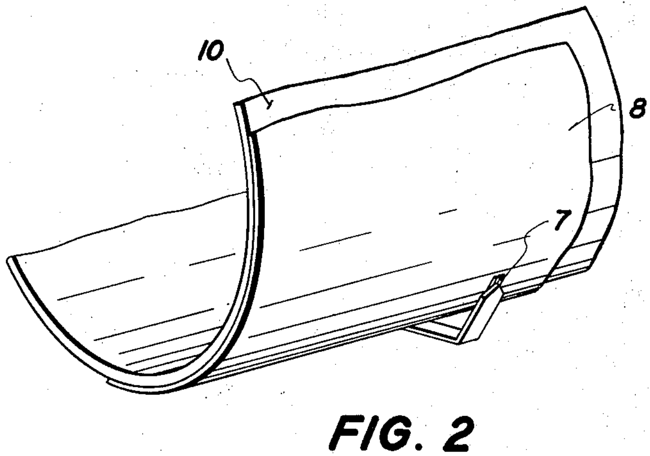
FIG. 2 shows a portion of the stylus shank and the writing tip of the stylus assembly.

Referring to FIG. 1 there is shown a facsimile transceiver including a cylindrical drum 1 which is designed to rotate about its longitudinal axis in synchronization with that of the transmitting station. The transceiver includes a carriage 3 which is designed to carry writing stylus assembly 5 having a stylus tip 7 for recording the incoming facsimile signals. For receiving the incoming signal, an electroresistive paper 8 (FIG. 2) is mounted on the surface of the cylindrical drum 1.

Figures 3, 4:
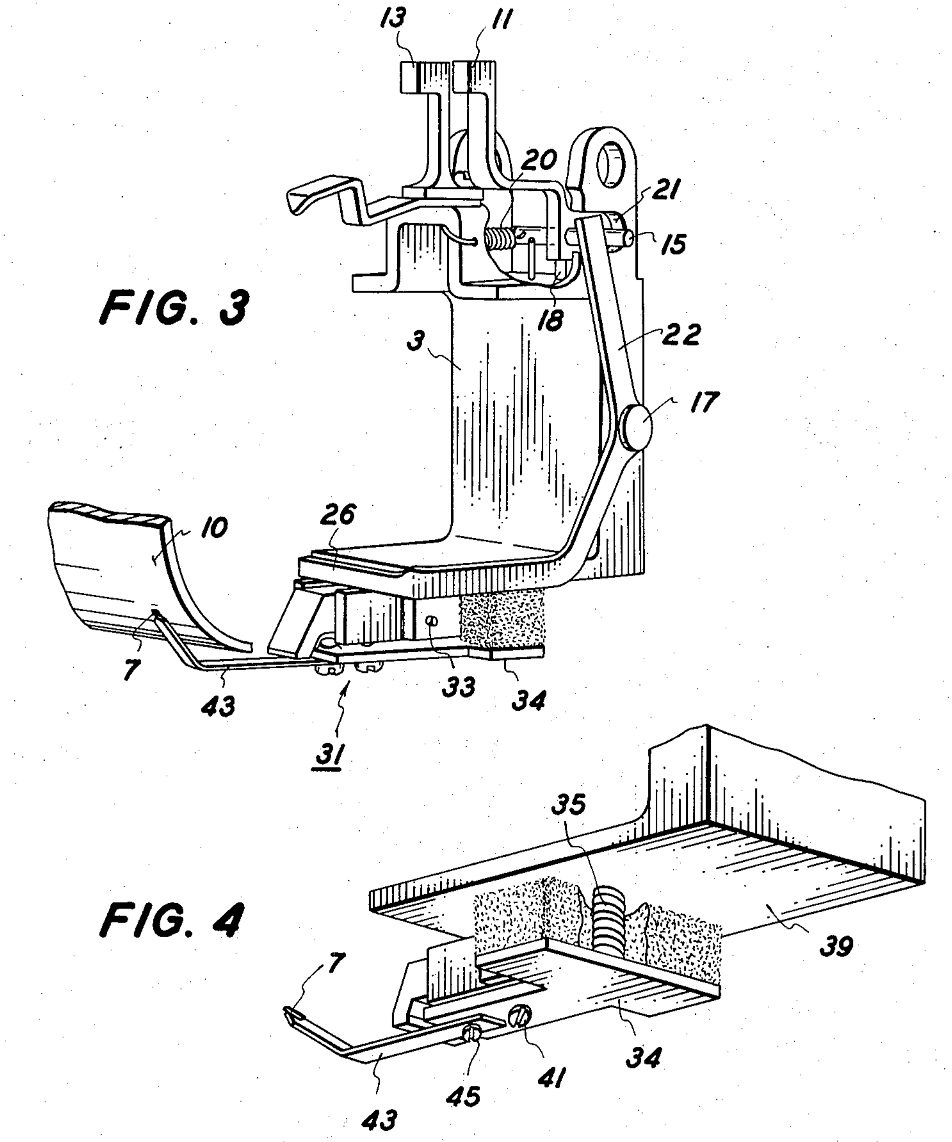
FIG. 3 shows in a perspective view of the stylus assembly and a portion of the carriage assembly.
FIG. 4 shows a detailed view of the pen guide portion of the stylus assembly.

Referring to FIGS. 1 and 3, in operation, before the paper 8 is mounted on the drum, the operator pinches a movable lever 11 against a stationary lever 13 fixedly attached to the carriage frame. The operator moves the assembly while pinching the movable lever 11 against the stationary lever and at the same time pushing the levers 11 and 13 toward the position she wishes to move the assembly along a guide rail 14 provided in the transceiver. By pinching the movable lever 11, the stylus tip 7 is pushed away from the drum surface. Having moved the stylus assembly to a desired position, the operator then releases the movable lever 11 and this causes the stylus tip 7 to return to its normal operating position of touching the paper or the drum surface 10, if the paper is not placed.

It has been found that the operator generally tends to release the movable lever 11 away from the stationary lever 13 quickly in a snap as soon as they finish moving the two levers to the starting position or as they are about to reach the desired position. The presently existing stylus assembly is designed so that when the movable lever 11 is released, the stylus tip tends to snap back and hit against the relatively hard drum surface. This results in having the stylus tip bent or break and render it unusuable.

Figure 5:
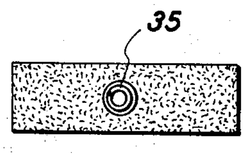
FIG. 5 shows that portion of the pen guide which shows the details of a metal spring and the closed cell polyurethane foam spring surrounding the metal spring.

Referring to FIGS. 3, 4 and 5, the writing stylus assembly of the facsimile transceiver includes pivot levers 15 and 17 which translate the sidewise motion of the movable lever 11 into a downward motion. More particularly, referring to FIG. 3, the movable lever 11 and the pivot lever 15 are pivoted about the pivot 18. One end of the pivot lever 15 is connected to the carriage frame 3 by a spring 20 and other end is disposed in an elongated aperture 21 of the frame. The aperture 20 defines the limit to the linear movement of the pivot 15. The spring rotates the lever 15 counter clockwise about its pivot 18 and brings the lever 15 to the released position as shown when the movable lever 11 is released. The pivot lever 17 includes an elongated upwardly extended arm 22, an end position of which is positioned relative to the movable lever 15 so that the lever 15 can move the pivot lever 17 counter clockwise about its pivot 24 attached to the frame 3. The lever 17 has a downward extension, the end of which is bent to form an arm 26 which rests on the pen guide 31 of the stylus assembly.

The pen guide 31 is pivotally mounted to the stylus assembly frame by a pivot 33. This allows the guide a degree of freedom of movement about the pivot. The pen guide includes a plate 34 which holds a spring 35 (FIG. 4) under compression against a planar bottom 39 of the stylus carriage frame. The compressed spring provides a counter clockwise torque to the pen guide 31. The torque in turn causes the stylus tip 7 to press against the drum. The amount of pressure that the compressed spring 35 applies against the drum is adjusted using a screw 41 which tightens or loosens the plate 34 against the spring 35 against the bottom 39 of the stylus carriage frame. The shank portion 43 of the stylus is attached to the pen guide at its bottom by a screw 45.

In operation, in its normal or released state, the movable lever 11 is placed some distance away from stationary lever 13 by the counter clockwise torque provided by the spring 20 about the pivot 18. The spring 35 provides clockwise torque to the pen guide to assume a position as shown in FIGS. 3 and 4 whereby the tip 7 of the stylus touches the drum surface 10. The amount of the pressure with which the stylus tip is made to press against the drum is set by the set screw 41. When the movable lever 11 is pinched or moved against the stationary lever 13, this moves the pivot lever 15 clockwise about its pivot 24. In turn, the arm 26 of the lever 17 applies a downward force to the pen guide 31. The downward force applied by the lever arm 26 provides a counter clockwise pressure against the pen guide 31. This causes the pen guide downward or rotate counter clockwise about the pivot 33. As a result, the shank 43 and the tip 7 of the stylus are moved downwardly away from the drum surface 10.

When the movable lever 11 is released, it releases the pivot levers 15 and 17 to resume their normal positions. This in turn removes counter clockwise torque applied to the spring 35 when the lever 11 was pinched, allows it to relax and return toward its earlier less compressed state. As the spring 35 relaxes, it provides a clockwise torque about is pivot 33 and causes the pen guide 31 and hence the stylus shank 43 and tip 7 to rotate clockwise. This continues until the tip 7 moves toward and presses against the surface 10 of the drum. The amount of pressure with which the tip 7 presses against the drum is essentially set by the compressed spring 35.

Typically, for the telecopier facsimile transceivers placed in the field by Xerox Corporation, the spring compression is set so that the stylus tip provides about 7 gram of pressure against the drum surface. It has been found that for the electroresistive paper used in these transceivers, this amount of pressure is sufficient for the stylus tip to ride on the paper 8 and establish a good electrical contact throughout the operation so that the facsimile signal current is allowed to flow to the electroresistive paper from the tip.

It has been found that with the existing design when the lever 11 is released, the compressed spring 35 bounces back toward its less compressed state rather quickly in about 50 miliseconds. In this time duration, the pen guide 31, the stylus shank 43 and the stylus tip 7 are rotated clockwise rather quickly. The quick return of the stylus shank 43 and the stylus tip 7 causes the stylus tip 7 to snap back and hit against the drum surface 10. The stylus tip for the facsimile unit is made of platinum wires of a few mils in diameter. It has been found that repeated hitting against the drum surface as it is subjected in actual use cause the stylus wires to bend or become damaged. As a result, the contact area formed by the tip which defines the resolution or quality of the image deteriorates. This renders the stylus useless in performing its intended function and thereby shortens its useful life.

In accordance with the present invention the foregoing shortcomings are overcome substantially by using a piece of closed cell polyurethane foam as an element for retarding the relaxation speed of the compressed spring 35. While it is not clearly understood, it is thought that the closed cell polyurethane foam provides its retarding action in that a plurality of closed cells formed by the membrane of the polyurethane that make up the foam act like a control valve. Apparently, each of the closed cells acts like a tiny spring valve in that the membrane forming the cell allows the air to go out of the cell when compressed and go in when the pressure is removed so that the cells regain their original shape. Thus, collectively, a large number of cells act like a valve wherein the aggregate deforms in response to an external pressure and returns to the original shape when the pressure is removed. The rates of the deformation and regaining of the original shape depend, however, largely upon the inherent characteristic of the closed cell polyurethane foam. That is, the speed with which the cells can be compressed or expand depend largely upon the speed with which the air is allowed to flow through the membrane into and out of the closed cells.

As shown in FIG. 5 in using a piece of the foam, a circular hole was carved out to place a metal coil spring 35 in it. The size of the foam is dimensioned so that in the normal operative state, that is, where the stylus tip touches the drum, the foam takes its relaxed state and thus does not add any torque to the spring. When the lever 11 is pinched and the pen guide 37 compresses the spring 35 and moves the tip 7 away from the drum surface 10, the foam is compressed as the air is let out of the cells. When the movable lever 11 is released, the counter clockwise torque applied by the lever arm 26 is removed. This permits the compressed spring 35 to try to regain its relaxation state, i.e., move toward its less compressed state, rather fast largely under the influence of the decompressing force because at this point the foam does not offer much resistance to relaxation action of the spring 35. However, as the squeezed foam tries to recover its relaxed state and as the valve action of the cells start to take effect the return rate of the foam fixed by the speed with which the membranes allow the air to refill the closed cells. This action of the cells now becomes dominant and thus controls the speed with which the spring regains its less compressed state. The refilling speed is much slower however than the speed with which the spring can regain its less compressed state. This causes the stylus tip 7 to reach the drum surface 10 gradually and finally presses against it by the predetermined amount of compression against the spring 35 set by the compression plate 37.

The present invention described in conjunction with an embodiment shown in FIGS. 1–5 was demonstrated by a number of experiments. For one experiment, the applicant used a piece of a 3 pound per cubic foot closed cell polyurethane foam measuring in size 9/16 × 9/16 × 9/16 inches and conforming to ASTMD 1564 standard. The foam used had a non-reticulated skeletal structure with the majority, approximately 70 percent, of the cells having unbroken windows or membranes. The foam was a self-extinguishing flexible foam having low compression deflection ratio. A small cylincrical portion of the foam was drilled out in the center to fit a metal coil spring having four pound/inch compression characteristics, manufactured and sold by Lee Spring Company. The spring had a free length of 0.56 inch in relaxed depth and had a solid depth of 0.125 inch after it is fully compressed. The pressure screw 41 was set so that it compressed the 0.56 inch spring to about 0.45 inch in the normal operative state, i.e., the state where the stylus tip 7 touches the drum for operation.

After placing the spring, the upper and lower side of the foam was glued to the bottom of the stylus carriage frame 39 and the compression plate 37 respectively, next to the pivot pin 33 as shown. The structure assembled in this manner was tested to measure the return speed of the stylus tip. At the beginning the return time was measured about 550 miliseconds. This compares to the 50 milisecond without the form thereby clearly demonstrating the retarding effect of the foam.

The same stylus assembly was then subjected to a simulated test involving 24,000 cycles of operation. It was found that the release time gradually decreased to about 130 miliseconds as apparently some of the closed cell of the polyurethane foam began to be torn by the repeated action of compression and expansion and thereby decreasing the effect amount of retarding action. But even at this level, the retarding speed is still noticable as compared to the 50 milisecond recovery time without the form. It should be noted also that 24,000 cycles of tests exceeds an estimated number of life cycle operation without major repair or replacement of parts of the rest of the transceiver in actual use.

It is noted here that about the ten fold increase in return time (50 milisecond without foam versus 550 milisecond with foam) does not interfere with the normal operation of the facsimile transceiver in that it normally requires at the beginning of each successive transmission a document a 15 second time interval during which the handshaking signals are exchanged between the transmitter and receiver and during which no graphic signal is actually transmitted and nor received.

While the present invention is described in the context of a stylus assembly in a facsimile transceiver, the principle thereof is clearly not limited to a facsimile stylus. Various modifications, extensions or applications of the present invention may be made without departing from the spirit and scope of the teachings of the present invention.

What is claimed is:

1. A writing stylus assembly for use in a facsimile transceiver wherein the stylus is moved by a carriage to record the incoming facsimile signal on a writing medium such as an electroresistive paper held against a drum, including lever means for moving said assembly manually to a desired position and moving the tip of the writing stylus away from the drum surface upon actuation so that the tip can be moved to the position without touching the drum, a pen guide pivotally mounted on the stylus assembly frame and holding the writing tip of the stylus, a metallic spring positioned between said pen guide and style frame and applying a torque to said pen guide about its pivot so that the stylus tip is urged against the drum so that the tip rides on the surface of the writing medium with a predetermined amount of force, and a flat planar piece of closed cell polyurethane foam responsive to the release of said lever means for counteracting the spring action of said spring means and retarding the return speed of the stylus and thereby preventing said stylus tip from snapping back and hitting the drum, said closed cell polyurethane foam having a hole at the center thereof to hold the spring therein in a position traverse to the flat surfaces, the two major surfaces of said foam being glued onto the stylus assembly frame and pen guide, said pen guide including means for compressing the coil spring by a predetermined amount of pressure to impart an effective amount of torque to said pen guide for urging the stylus tip against the drum, said foam being dimensioned so that at the normal operative position its cells are in a relaxed state.

* * * * *